(12) United States Patent
Zangoli et al.

(10) Patent No.: US 12,232,242 B2
(45) Date of Patent: Feb. 18, 2025

(54) POWER SUPPLY CIRCUIT FOR A COOKING DEVICE AND COOKING DEVICE

(71) Applicant: ELECTROLUX APPLIANCES AKTIEBOLAG, Stockholm (SE)

(72) Inventors: Massimo Zangoli, Forli (IT); Massimo Nostro, Forli (IT); Alex Viroli, Forli (IT); Andrea Rossi, Forli (IT); Enrico Valentini, Forli (IT); Emanuel Urgese, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 731 days.

(21) Appl. No.: 17/433,635

(22) PCT Filed: Feb. 20, 2020

(86) PCT No.: PCT/EP2020/054560
§ 371 (c)(1),
(2) Date: Aug. 25, 2021

(87) PCT Pub. No.: WO2020/178043
PCT Pub. Date: Sep. 10, 2020

(65) Prior Publication Data
US 2022/0151035 A1  May 12, 2022

(30) Foreign Application Priority Data
Mar. 4, 2019  (EP) ..................................... 19160569

(51) Int. Cl.
*H05B 6/06* (2006.01)
*H05B 6/04* (2006.01)
(Continued)

(52) U.S. Cl.
CPC ............... *H05B 6/065* (2013.01); *H05B 6/04* (2013.01); *H05B 6/1272* (2013.01); *H02M 7/217* (2013.01); *H05B 2213/03* (2013.01)

(58) Field of Classification Search
CPC ..... H02M 7/217; H05B 2213/03; H05B 6/04; H05B 6/062; H05B 6/065; H05B 6/1272
(Continued)

(56) References Cited

U.S. PATENT DOCUMENTS 9,084,295 B2 * 7/2015 Sadakata ................ H05B 6/062
2009/0230123 A1  9/2009 Egenter et al.
(Continued)

FOREIGN PATENT DOCUMENTS

CN  206164881  5/2017
EP  2007174  12/2008
(Continued)

OTHER PUBLICATIONS

European Office action for 19160569.0, dated Feb. 3, 2022, 6 pages.
(Continued)

*Primary Examiner* — Quang T Van
(74) *Attorney, Agent, or Firm* — Chrisman Gallo Tochtrop LLP

(57) ABSTRACT

The disclosure relates to a power supply circuit for a cooking device, in particular for an induction cooking device, more particularly for an induction hob, wherein the power supply circuit includes a single frequency adapting unit, in particular a filtering unit, for adapting at least one external supply signal into a single or at least one internal AC supply signal; at least one DC signal generating unit for converting the one or at least one internal AC supply signal into at least one signal component of an internal DC supply signal; and at least one heating frequency generating unit for converting one or at least one DC supply signal supplied by at least one
(Continued)

Figure 1:
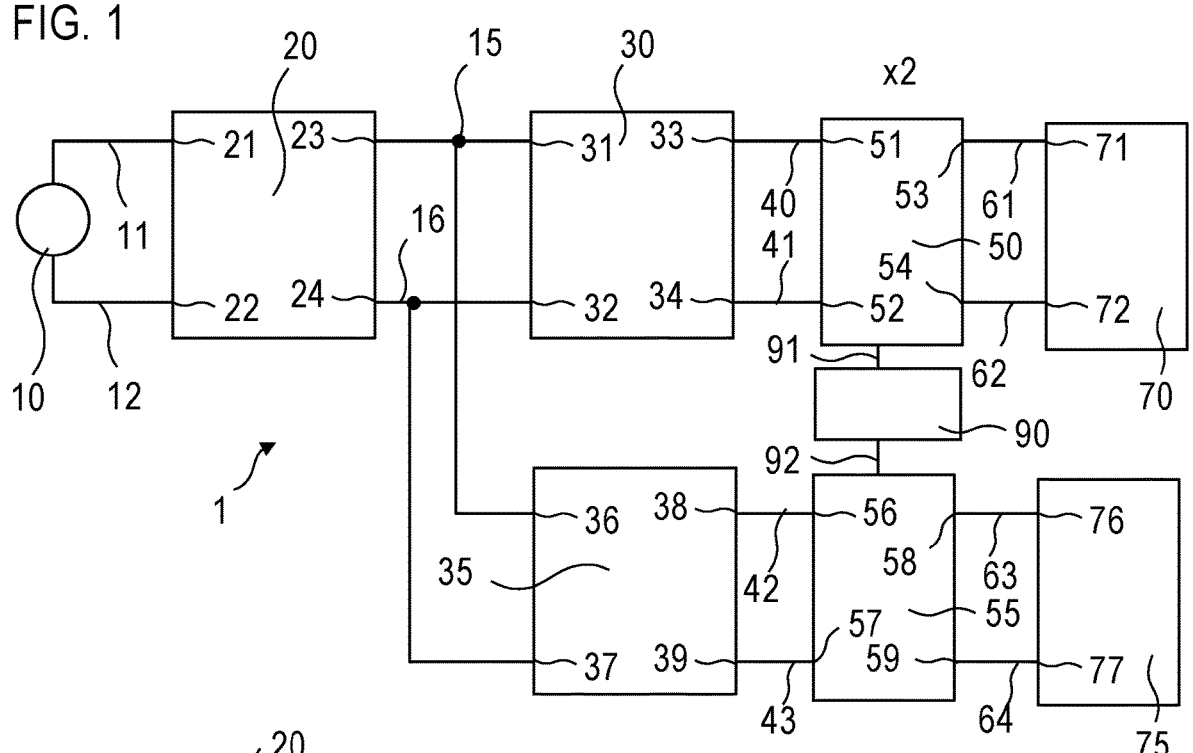

DC signal generating unit into a heating frequency signal for supplying at least one heating unit with electrical power.

18 Claims, 3 Drawing Sheets

(51) Int. Cl.
*H05B 6/12* (2006.01)
*H02M 7/217* (2006.01)

(58) Field of Classification Search
USPC ....... 219/620, 621, 622, 623, 624, 625, 626, 219/627, 635, 660, 661–667, 672–676, 219/445.1; 363/21, 97
See application file for complete search history.

(56) References Cited

U.S. PATENT DOCUMENTS

2012/0043312 A1* 2/2012 Lee .................. H05B 6/062
219/622

2012/0285948 A1* 11/2012 Shan .................. H05B 6/062
219/660
2018/0176997 A1 6/2018 Nam et al.

FOREIGN PATENT DOCUMENTS

| EP | 2095686 | 9/2009 |
|----|---------|--------|
| EP | 2416621 | 2/2012 |
| EP | 3445135 | 2/2019 |
| JP | 2003282226 | 10/2003 |

OTHER PUBLICATIONS

International Search Report and Written Opinion for PCT/EP2020/054560, dated Apr. 17, 2020, 10 pages.

Chinese Office action (english translation) for 202080018451.1, dated Apr. 13, 2023, 6 pages.

* cited by examiner

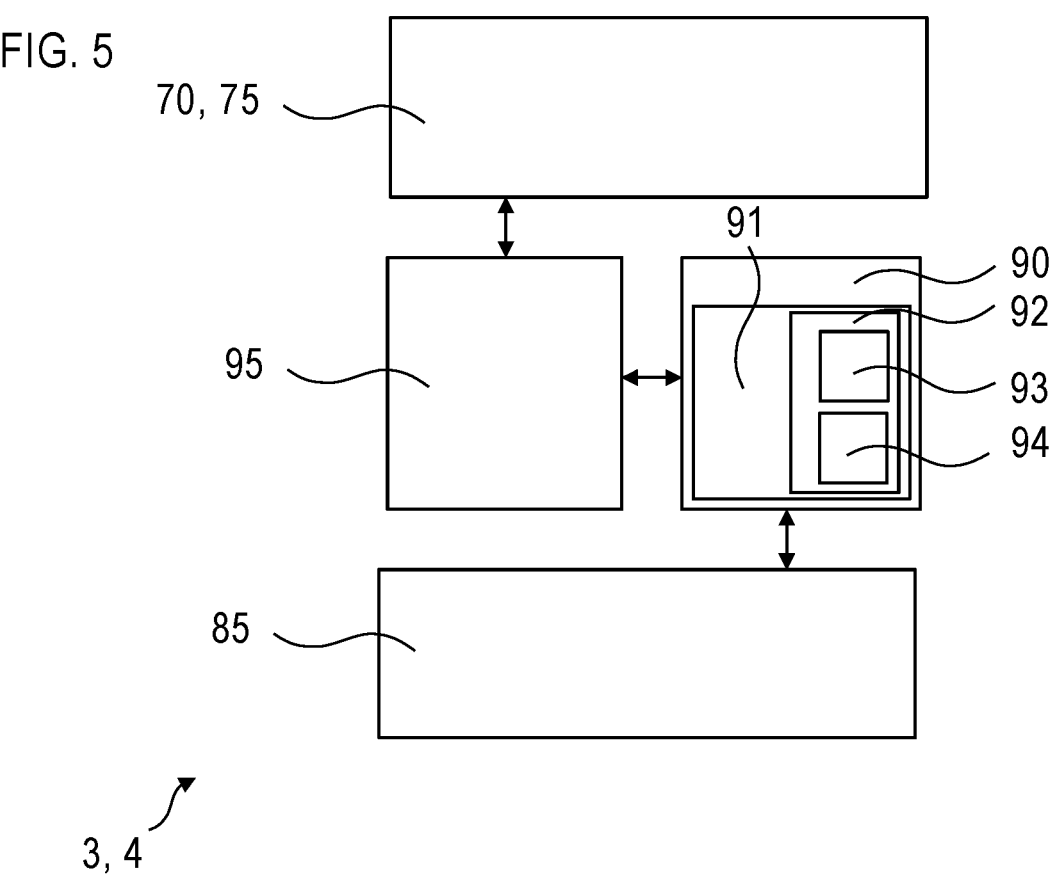

POWER SUPPLY CIRCUIT FOR A COOKING DEVICE AND COOKING DEVICE

The invention relates to a power supply circuit for a cooking device, in particular for an induction cooking device, more particularly for an induction hob, and to a corresponding cooking device.

Heating units for cooking devices, in particular for induction cooking devices, can be powered and/or operated by means of heating frequency generating units which each convert an internal DC supply signal into a heating frequency signal. In particular, for a power supply circuit, there can be a need to drive more than one or more than two heating units.

In order to generate heating power, the heating frequency generating units can supply the heating units with a heating frequency signal. Such an arrangement is shown in EP 2 095 686 B1. By means of a heating frequency signal, heating power can be generated in a heating unit.

For controlling the power supplied to the heating units individually for different heating units, preferably the frequencies of the heating frequency signals can be varied differently for different heating units.

However, in particular when a group of different heating frequency generating units is supplied by the same internal DC supply signal and, at the same time, operated with different frequencies, interference between the different heating frequency generating units can occur, which can result in disadvantageous effects, for example noise and an exceeding of the maximum tolerable rate of rise or fall of the differential voltages of the involved group of heating frequency generating units, which is preferably defined as the immunity of the group of frequency generating units.

It is therefore an object of the invention to provide an improved, and preferably cost effective and/or flexible, power supply circuit for a cooking device, which in particular avoids or at least reduces the disadvantageous effects as described above.

The invention relates to a power supply circuit for a cooking device, in particular for an induction cooking device, more particularly for an induction hob, wherein the power supply circuit is comprising a, in particular a single, frequency adapting unit, in particular filtering unit, for adapting at least one external supply signal into a single or at least one internal AC supply signal, at least one, at least two, two, at least three or three DC signal generating units, each for converting the one or at least one internal AC supply signal into at least one signal component, in particular one or two signal components, of an internal DC supply signal and at least one, at least two, in particular two, at least three, three, at least four or four, heating frequency generating units, each for converting one or at least one DC supply signal supplied by at least one DC signal generating unit into a heating frequency signal for supplying at least one heating unit with electrical power.

The invention relates in particular to a power supply circuit for an induction hob, wherein the power supply circuit is comprising a single frequency adapting unit, in particular filtering unit, for adapting a or one external AC supply signal into one internal AC supply signal, and two DC signal generating units, each for converting the internal AC supply signal into two signal components of an internal DC supply signal and three, in particular at least three, four or at least four heating frequency generating units, each for converting a or one DC supply signal supplied by a or one DC signal generating unit into a heating frequency signal for supplying at least one heating unit with electrical power.

The invention relates in particular to a power supply circuit for an induction hob, wherein the power supply circuit is comprising a single frequency adapting unit, in particular filtering unit, for adapting a or one AC external supply signal into one internal AC supply signal, and two DC signal generating units, each for converting the internal AC supply signal into one signal component of an internal DC supply signal and three, in particular at least three, four or at least four heating frequency generating units, each for converting one DC supply signal supplied by two DC signal generating units into a heating frequency signal for supplying at least one heating unit with electrical power.

Preferably, the power supply circuit is comprising at least two, two, at least three or three DC signal generating units, each for converting the internal AC supply signal into an internal DC supply signal or into at least one signal component, in particular one or each signal component, of an internal DC supply signal.

By means of a power supply circuit according to the invention, in particular when different heating frequency generating units are supplied with power, at least partially, by different internal DC supply signals, and, at the same time, operated with different frequencies, interference between the different heating frequency generating units can be avoided or at least reduced.

For example, noise and/or an exceeding of the maximum tolerable rate of rise or fall of a differential voltage, which preferably defines the immunity of the group of frequency generating units, of the heating frequency generating units in a group supplied with power by an or a single internal DC supply signal can be avoided or at least reduced.

In particular, it can be advantageous to power only one, only two, up to two, only three or only up to three heating frequency generating units with a respective internal DC supply signal as a group, so that a separated DC supply signal can be provided for each single or each pair or triple of heating frequency generating units.

It has been investigated that interference can be controlled better and therefore at least reduced when not too many heating frequency generating units are supplied with a respective DC supply signal, in particular when a respective internal DC supply signal supplies not more than three, preferably not more than two heating frequency generating units with electrical power.

The invention allows to share common parts between DC supply signals or DC buses. In particular, only one external and internal AC supply signal can be sufficient for supplying the DC signal generating units with electrical power. Therefore a, preferably only one single, frequency adapting unit can be sufficient to supply the DC signal generating units of the power supply circuit with electrical power. Hence, the invention is in particular cost-effective, as only one frequency adapting unit, in particular filtering circuit, can be necessary for the power supply circuit.

The invention is also flexible, as it allows to easily vary the number of units in the circuit. For example, for different cooking devices, a different number of heating frequency generating units can be necessary. Depending on the number of heating frequency generating units needed, in particular depending on the number of pairs of heating frequency generating units needed, the number of DC signal generating units and hence the number of DC supply signals can correspondingly vary.

Preferably, the invention nevertheless allows a robust operation in terms of interference noise and immunity. The invention allows to reduce noise, in particular when no more than two heating frequency generating units, also denominated as generators, are operated by means of the same DC supply signal or on the same DC bus. In particular, the same algorithm for noise reduction can be applied for each pair of heating frequency generating units, preferably in case each pair of heating frequency generating units is supplied by a different DC supply signal.

A DC supply signal is in particular a direct current supply signal with an unidirectional flow of electric charge. The DC supply signal is in particular supplied by two different signal components which can be two different wires, wherein one of the signal components or wires provides a DC voltage and another one of the signal components or wires provides a ground or reference voltage. Nevertheless, the amplitude of the DC supply signal can vary.

An AC supply signal is in particular an alternating current supply signal with a bidirectional flow of electric charge. The AC supply signal is in particular supplied by two different signal components which can be two different wires, wherein one of the signal components or wires provides an AC voltage and another one of the signal components or wires provides a ground or reference voltage. An external AC supply signal is in particular a mains voltage signal with a single current and/or voltage phase.

In an embodiment, each signal is supplied by a first and a second signal component.

In an embodiment, the first signal component of each DC signal generating unit supplies a DC voltage and the second signal component supplies a ground voltage, wherein preferably each DC signal generating unit is connected to the same common ground voltage, GND.

In an embodiment, the power supply circuit comprises a single internal AC supply signal.

In an embodiment, the or one internal AC supply signal supplies one, at least one, two, at least two or at least three DC signal generating units with electrical power.

In an embodiment, each DC supply signal constitutes a DC bus, wherein the power supply circuit in particular comprises two or at least two DC buses.

In an embodiment, each DC supply signal supplies one, at least one, two, at least two or at least three heating frequency generating units with electrical power.

In an embodiment, a first DC supply signal supplies one, at least one, two, at least two or at least three heating frequency generating units with electrical power and a second DC supply signal supplies one, at least one, two, at least two or at least three heating frequency generating units with electrical power.

In an embodiment, the power supply circuit comprises a number of N DC buses, wherein N>1, wherein in particular N=2 or N=3, wherein in particular each DC bus supplies a group of heating frequency generating units with electrical power.

In an embodiment, each DC signal generating unit and/or each internal DC supply signal supplies two or at least two heating frequency generating units with electrical power.

In particular, the N DC buses can share a common signal component, a common line or a common node. More in particular, the N DC buses can share a common ground signal component, a common ground line or a common ground node. More in particular, the N DC buses can share a common GND signal component, a common GND line or a common GND node.

In an embodiment, each heating frequency signal comprises a frequency of at least 10 kHZ, in particular of at least 25 kHz, and/or a frequency of less than 100 kHZ.

In an embodiment, by varying the frequency of the heating frequency signal, the generated heating power of the heating unit can be varied.

In an embodiment, the frequency adapting unit comprises a frequency filter circuit, in particular a low-pass filter circuit, an RC filter circuit and/or an LC filter circuit.

In an embodiment, the DC signal generating units are rectifiers, in particular bridge and/or diode rectifiers and/or AC/DC converters.

In an embodiment, the DC signal generating units are half bridge rectifiers, in particular half bridge diode rectifiers, more in particular with only two diodes and/or with only one output and/or with common anode or cathode.

In an embodiment, each DC signal generating unit comprises only a single DC output, each for supplying one signal component to at least one heating frequency generating unit.

In an embodiment, the DC output of a first DC signal generating unit is connected to the first DC input of a first heating frequency generating unit and the DC output of a second DC signal generating unit is connected to a second DC input of the first heating frequency generating unit.

In an embodiment, the DC output of a third DC signal generating unit is connected to the first DC input of a second heating frequency generating unit and the DC output of the second DC signal generating unit is connected to the second DC input of the second heating frequency generating unit.

In an embodiment, each heating frequency generating unit comprises two DC inputs, each for supplying one signal component from one or at least one DC signal generating unit.

In an embodiment, each heating frequency generating unit comprises at least one electric switch, in particular at least one relay and/or at least one electronic switch, in particular at least one semiconductor switch, more in particular at least one insulated-gate bipolar transistor, IGBT.

In an embodiment, each heating frequency generating unit comprises at least one half bridge circuit and/or at least one quasiresonant circuit for generating the heating frequency signal.

In an embodiment, the power supply circuit is implemented on a single board, in particular on a single power board or printed circuit board, PCB.

In an embodiment, the power supply circuit, in particular on the printed circuit board, interacts with a control unit and/or with at least one user interface, in particular by means of a communication bus.

In an embodiment, the control unit comprises a frequency control unit for controlling the heating frequencies of the heating frequency generating units, in particular independently.

In an embodiment, the frequency control unit comprises an interference control unit for controlling the interference between heating frequency generating units, in particular between the heating frequency generating units supplied by a single DC bus.

In an embodiment, the interference control unit comprises at least one of a noise reduction unit for reducing noise originating from an interference of different heating frequency generating units and/or an immunity unit for reducing parasitic effects originating from an electromagnetic interference of different heating frequency generating units, in particular of the heating N frequency generating units supplied by a single DC bus.

In an embodiment, the noise reduction unit comprises a means for shifting the frequency difference between the frequencies of the heating frequency signals of a first and a second heating frequency generating unit to a frequency difference outside the audible range, in particular by switching at least one frequency to either a first frequency, wherein the frequency difference is below the audible range, or to a second frequency, wherein the frequency difference is above the audible range, wherein in particular the first and the second heating frequency generating units establish a group of heating frequency generating units connected to the same DC bus.

In an embodiment, the cumulated maximum power of the at least two, two, at least three or three DC signal generating units is larger than the maximum power of the frequency adapting unit.

In an embodiment, the external supply signal is an AC voltage signal, in particular a one-phase AC voltage signal, preferably with a voltage of 220V to 250V. In an embodiment, the external supply signal is a mains voltage signal.

The invention also relates to a cooking device, in particular hob, more in particular induction hob with one, at least one, two, at least two or three power supply circuits according to the invention.

In an embodiment, the cooking hob comprises at least one control unit and/or at least one user interface.

In an embodiment, the cooking hob comprises at least four, in particular at least six, at least eight or at least twelve heating units, wherein each heating unit preferably comprises at least one inductor, more preferably at least one coil.

In an embodiment, the coils are shaped in triangular or circular form, wherein in particular two and/or four coils in triangular shape are arranged as a square.

In an embodiment, the cooking hob comprises two or three power supply circuits, wherein each power supply circuit is arranged on a separated power board and/or each power supply circuit is supplied by a different voltage phase of a 2-phase or three-phase power supply.

Figure 2:
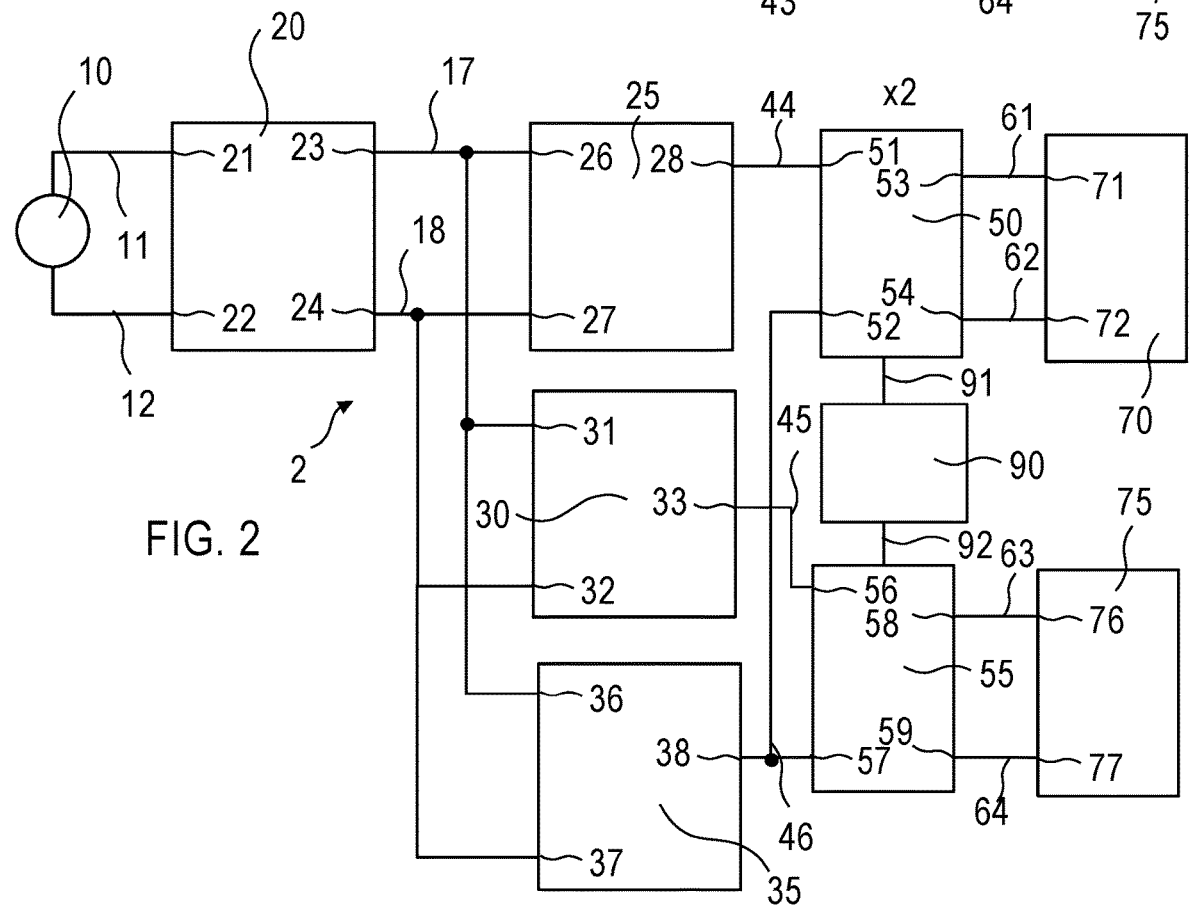
Figure 3:
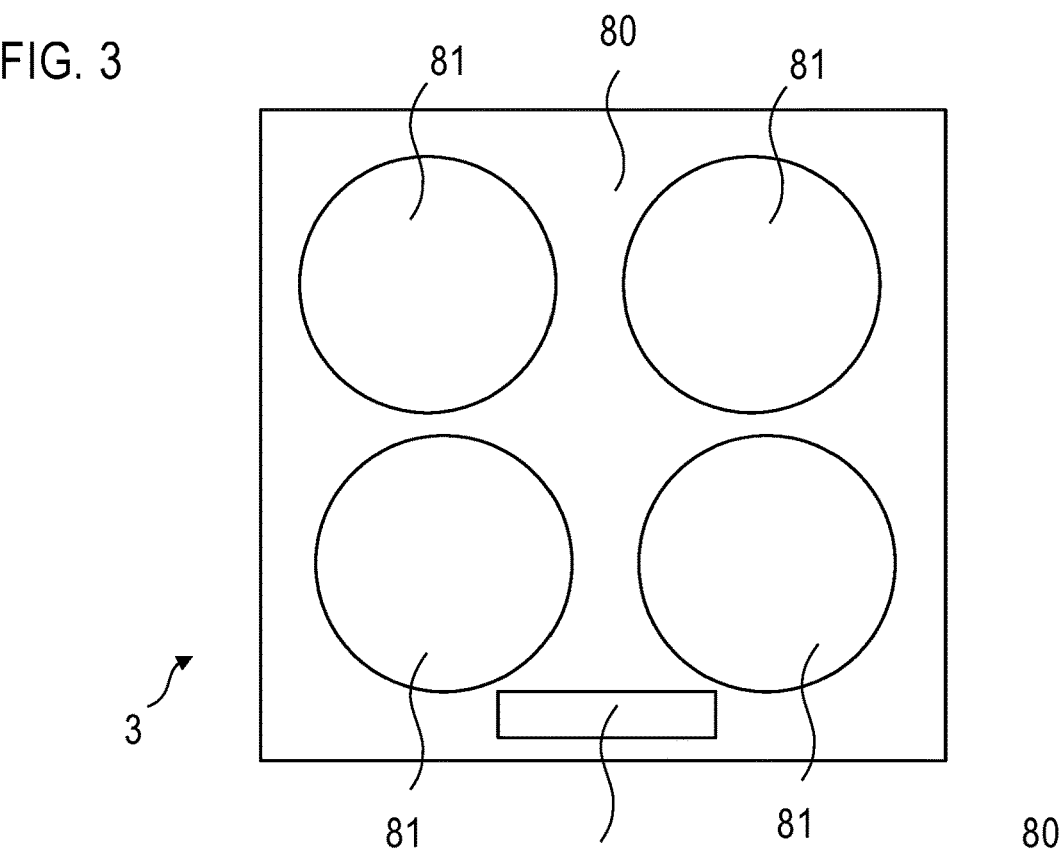
Figure 4:
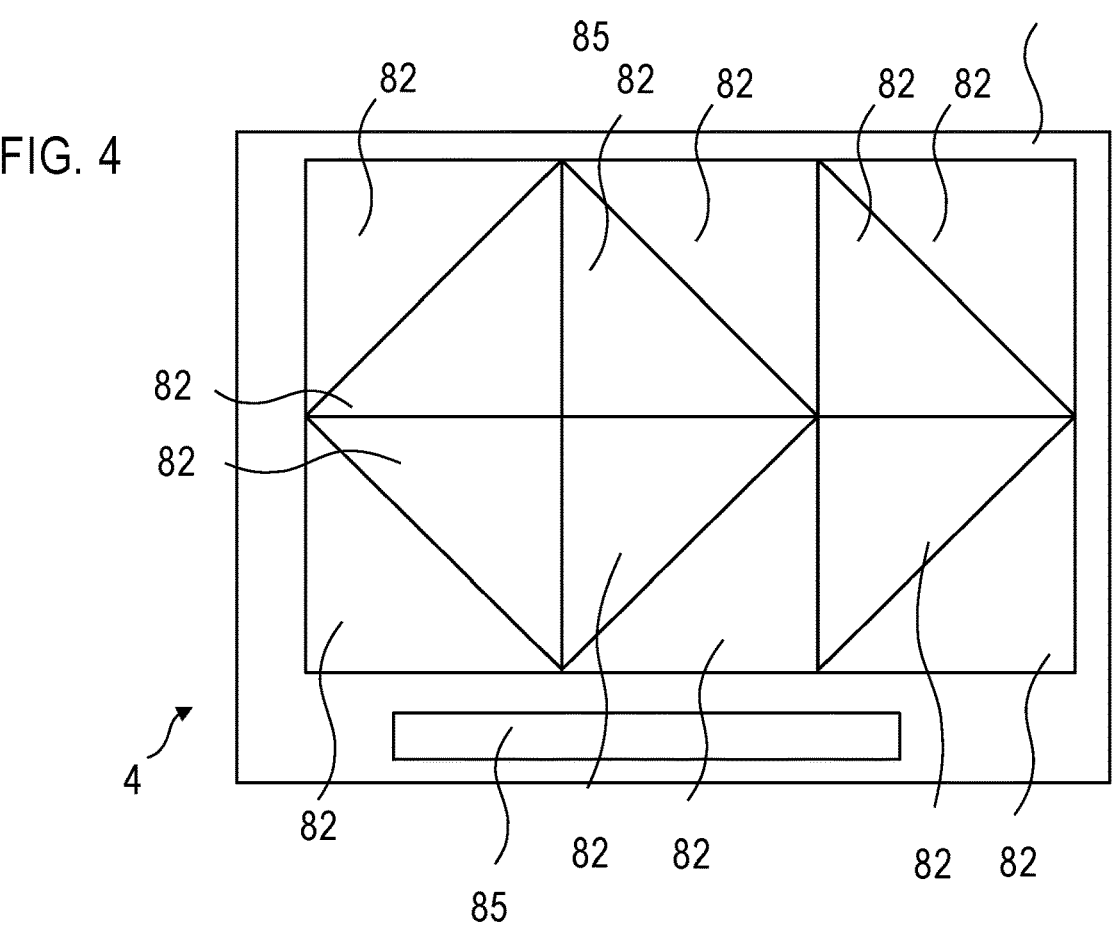

The present invention will be described in further detail with reference to the drawings, in which FIG. 1 shows a power supply circuit according to a preferred embodiment of the present invention, FIG. 2 shows an alternative power supply circuit according to the preferred embodiment of the present invention, FIG. 3 shows a cooking hob according to the preferred embodiment of the present invention, FIG. 4 shows an alternative cooking hob according to a preferred embodiment of the present invention, and FIG. 5 shows a cooking hob according to a preferred embodiment of the present invention.

FIG. 1 shows a power supply circuit 1 for a cooking device, in particular for an induction cooking device, more particularly for an induction hob 80.

The power supply circuit 1 is comprising a single frequency adapting unit 20, in particular filtering unit, for adapting an external supply signal 11, 12 into a or one internal AC supply signal 15, 16. The frequency adapting unit 20 adapts, in particular filters, at least one frequency of the external supply signal 11, 12 and/or of the internal AC supply signal 15, 16.

The power supply circuit 1 is comprising two DC signal generating units 30, 35, each for converting the one internal AC supply signal 15, 16 into an internal DC supply signal 40, 41, 42, 43, in particular into two signal components of an internal DC supply signal 40, 41, 42, 43.

The power supply circuit 1 is comprising at least two, in particular at least four, heating frequency generating units 50, 55, each for converting at least one DC supply signal 40, 41; 42, 43, each supplied by one DC signal generating unit 30, 35, into a heating frequency signal 61, 62; 63, 64 for supplying at least two heating units 70, 75 with electrical power.

The power supply circuit 1 is preferably comprising at least two heating frequency generating units 50, each for converting the first DC supply signal 40, 41, supplied by the first DC signal generating unit 30, into heating frequency signals 61, 62 for supplying one, two or at least two heating units 70 with electrical power.

The power supply circuit 1 is preferably comprising at least two heating frequency generating units 55, each for converting the second DC supply signal 42, 43, supplied by the second DC signal generating unit 35, into heating frequency signals 63, 64 for supplying one, two or at least two heating units 75 with electrical power.

Each signal is supplied by a first and a second signal component. In particular, the internal AC signal 15, 16 is supplied by the first signal component 15 and the second signal component 16.

The first signal component 40 of the DC signal generating unit 30 supplies a first DC voltage and the second signal component 41 supplies a ground voltage. The first signal component 42 of the DC signal generating unit 35 supplies a second DC voltage and the second signal component 43 supplies a ground voltage. Preferably each of the DC signal generating units 30, 35 is connected to the same common ground voltage, GND.

The power supply circuit 1 comprises a single internal AC supply signal 15, 16. The internal AC supply signal 15, 16 supplies two DC signal generating units 30, 35 with electrical power.

Each DC supply signal 40, 41; 42, 43 constitutes a DC bus, wherein the power supply circuit 1 in particular comprises two or at least two DC buses. The DC supply signal 40, 41 constitutes a first DC bus. The DC supply signal 42, 43 constitutes a second DC bus.

Each DC supply signal 40, 41; 42, 43 supplies one, two or at least two heating frequency generating units 50, 55 with electrical power. The DC supply signal 40, 41 supplies one, two or at least two heating frequency generating units 50 with electrical power. The DC supply signal 42, 43 supplies one, two or at least two heating frequency generating units 55 with electrical power.

A first DC supply signal 40, 41 supplies one, at least one, two, at least two or at least three heating frequency generating units 50 with electrical power and a second DC supply signal 42, 43 supplies one, at least one, two, at least two or at least three heating frequency generating units 55 with electrical power.

The power supply circuit 1 comprises a number of N DC buses, wherein N>1. The power supply circuit 1 in FIG. 1 comprises a number of 2 DC buses.

In an embodiment, each DC signal generating unit 30, 35 and/or each internal DC supply signal 40, 41; 42, 43 supplies two or at least two heating frequency generating units 70; 75 with electrical power.

In an embodiment, the N DC buses can share a common signal component, a common line or a common node. More in particular, the N DC buses can share a common ground signal component, a com-mon ground line or a common ground node. More in particular, the N DC buses can share a common GND signal component, a com-mon GND line or a common GND node.

Each heating frequency signal 61, 62; 63, 64 comprises a frequency of at least 10 kHZ, in particular of at least 25 kHz. The frequency can be varied for adjusting the power of the heating units 70, 75. The heating frequency signal 61, 62 comprises a frequency of at least 10 kHZ, in particular of at least 25 kHz. The heating frequency signal 63, 64 comprises a frequency of at least 10 kHZ, in particular of at least 25 kHz.

The frequency adapting unit 20 comprises a frequency filter circuit, in particular a low-pass filter circuit, an RC filter circuit and/or an LC filter circuit.

The DC signal generating units 30, 35, can be rectifiers, in particular bridge and/or diode rectifiers and/or AC/DC converters and/or with common anode or cathode.

The DC signal generating units 30, 35 are in particular full bridge rectifiers, more in particular bridge diode rectifiers, more in particular with four diodes and/or with two outputs.

Each DC signal generating unit 30, 35 comprises two DC outputs 33, 34; 38, 39, each for supplying one signal component to at least one heating frequency generating unit 50, 55. The DC signal generating unit 30 comprises two DC outputs 33, 34, each for supplying one signal component to at least one, preferably two, heating frequency generating units 50. The DC signal generating unit 35 comprises two DC outputs 38, 39, each for supplying one signal component to at least one, preferably two or at least two heating frequency generating units 55.

Each heating frequency generating unit 50, 55 comprises two DC inputs 51, 52; 56, 57, each for supplying one signal component from the corresponding DC signal generating unit 30, 35. The heating frequency generating units 50 each comprise two DC inputs 51, 52, each for supplying one signal component from the corresponding DC signal generating unit 30. The heating frequency generating units 55 each comprise two DC inputs 55, 57, each for supplying one signal component from the corresponding DC signal generating unit 35.

Each heating frequency generating unit 50, 55 comprises at least one electric switch, in particular at least one relay and/or at least one electronic switch, in particular at least one semiconductor switch, more in particular at least one insulated-gate bipolar transistor, IGBT.

Each heating frequency generating unit 50, 55 comprises at least one half bridge circuit and/or at least one quasiresonant circuit for generating the heating frequency signal. The heating frequency generating units 50 comprise at least one half bridge circuit and/or at least one quasiresonant circuit. The heating frequency generating units 55 comprise at least one half bridge circuit and/or at least one quasiresonant circuit.

The power supply circuit 1 is implemented on a single board 95, in particular on a single power board or printed circuit board, PCB.

The power supply circuit 1 on the printed circuit board 95 interacts with a control unit 90 and with at least one user interface 85, in particular by means of a communication bus. This interaction is shown in FIG. 5.

The control unit 90 comprises a frequency control unit 91 for controlling the heating frequency of the heating frequency generating units 50, 55 on the power board 95, in particular independently.

The frequency control unit 91 comprises an interference control unit 92 for controlling the interference between heating frequency generating units 50, 55, in particular between the heating frequency generating units 50, 55 supplied by a single DC bus.

The interference control unit 92 comprises at least one of a noise reduction unit 93 for reducing noise originating from an interference of different heating frequency generating units 50, 55 and/or an immunity unit 94 for reducing parasitic effects originating from an electromagnetic interference of different heating frequency generating units 50, 55, in particular of the heating frequency generating units 50, 55 supplied by a single DC bus.

The noise reduction unit 93 comprises a means for shifting the frequency difference between the frequencies of the heating frequency signals of a first and a second heating frequency generating unit 50, 55 to a frequency difference outside the audible range, in particular by switching at least one frequency to either a first frequency, wherein the frequency difference is below the audible range, or to a second frequency, wherein the frequency difference is above the audible range.

The cumulated maximum power of the two or at least two DC signal generating units 30, 35 is larger than the maximum power of the frequency adapting unit 20.

The external supply signal 10 is a one-phase AC voltage signal, in particular with a voltage of 220V to 250V. The external supply signal is a mains voltage signal.

FIG. 2 shows a further power supply circuit 2 for a cooking device, in particular for an induction cooking device, more particularly for an induction hob 80.

The power supply circuit 2 is comprising a single frequency adapting unit 20, in particular filtering unit, for adapting an or one external AC supply signal 11, 12 into one internal AC supply signal 17, 18. The frequency adapting unit 20 adapts, in particular filters, at least one frequency of the external supply signal 11, 12 and/or of the internal AC supply signal 17, 18.

The power supply circuit 2 is comprising three DC signal generating units 25, 30, 35, each for converting the one internal AC supply signal 17, 18 into one signal component of an internal DC supply signal 44; 45, 46.

The power supply circuit 2 is comprising at least two, in particular at least four, heating frequency generating units 50, 55, each for converting a DC supply signal 44, 46; 45, 46, each supplied by two DC signal generating units 25, 35; 30, 35, into a heating frequency signal 61, 62; 63, 64, each for supplying one, two or at least one heating unit 70, 75 with electrical power.

Each signal is supplied by a first and a second signal component. In particular, the internal AC signal 17, 18 is supplied by the first signal component 17 and the second signal component 18.

The output 28 of the DC signal generating unit 25 supplies the first signal component 44 of a DC supply signal 44, 46 and the output 38 of the third DC signal generating unit 35 supplies a ground voltage as second signal component 46 of the DC supply signal 44, 46.

The output 33 of the second DC signal generating unit 30 supplies the first signal component 45 of a DC supply signal 45, 46 and the output 38 of the third DC signal generating unit 35 supplies a ground voltage as second signal component 46 of the DC supply signal 45, 46. The DC signal generating unit 35 is connected to the same common ground voltage, GND.

The power supply circuit 2 comprises a single internal AC supply signal 17, 18. The internal AC supply signal 17, 18 supplies two DC signal generating units 25, 30, 35 with electrical power.

Each DC supply signal 44, 46; 45, 46 constitutes a DC bus, wherein the power supply circuit 2 in particular comprises two or at least two DC buses. The DC supply signal 44, 46 constitutes a first DC bus. The DC supply signal 45, 46 constitutes a second DC bus.

Each internal AC supply signal 17, 18 supplies three DC signal generating units 25, 30, 35 with electrical power. The AC supply signal 17, 18 supplies three DC signal generating units 25, 30, 35 with electrical power.

Each DC supply signal 44, 46; 45, 46 supplies one, two or two heating frequency generating units 50, 55 with electrical power. The DC supply signal 44, 46 supplies one, two or at least two heating frequency generating units 50 with electrical power. The DC supply signal 45, 46 supplies one, two or at least two heating frequency generating units 55 with electrical power.

A first DC supply signal 44, 46 supplies one, at least one, two, at least two or at least three heating frequency generating units 50 with electrical power and a second DC supply signal 45, 46 supplies one, at least one, two, at least two or at least three heating frequency generating units 55 with electrical power.

The power supply circuit 2 comprises a number of N DC buses, wherein N>1. The power supply circuit 2 in FIG. 2 comprises a number of 2 DC buses.

In FIG. 2, the N DC buses share a common signal component, a common line or a common node. More in particular, the N DC buses share a common ground signal component, a com-mon ground line or a common ground node. More in particular, the N DC buses share a common GND signal component, a com-mon GND line or a common GND node.

Each heating frequency signal 61, 62; 63, 64 comprises a frequency of at least 10 kHZ, in particular of at least 25 kHz. The heating frequency signal 61, 62 comprises a frequency of at least 10 kHZ, in particular of at least 25 kHz. The heating frequency signal 63, 64 comprises a frequency of at least 10 kHZ, in particular of at least 25 kHz.

The frequency adapting unit 20 comprises a frequency filter circuit, in particular a low-pass filter circuit, an RC filter circuit and/or an LC filter circuit.

The DC signal generating units 25, 30, 35 can be rectifiers, in particular bridge and/or diode rectifiers and/or AC/DC converters.

The DC signal generating units 25, 30, 35 are in particular half bridge rectifiers, more in particular half bridge diode rectifiers, more in particular with only two diodes and/or with only one output and/or with common anode or cathode.

The DC signal generating units 25, 30, 35 in the embodiment of FIG. 2 are half bridge rectifiers by means of half bridge diode rectifiers. Those rectifiers comprise only two diodes, only one output as well as a common anode or cathode.

Each DC signal generating unit 25, 30, 35 comprises only a single DC output 28, 33, 38, each for supplying one signal component to at least one heating frequency generating unit 50, 55. The DC signal generating unit 25 comprises only a single DC output 28, for supplying one signal component to at least one, preferably two or at least two, heating frequency generating units 50. The DC signal generating unit 30 comprises only a single DC output 33, for supplying one signal component to at least one, preferably two or at least two, heating frequency generating unit 55. The DC signal generating unit 35 comprises only a single DC output 38, for supplying one signal component to at least two, preferably four or at least four heating frequency generating unit 50, 55.

The DC output 28 of a first DC signal generating unit 25 is connected to the first DC input 51 of a first heating frequency generating unit 50 and the DC output 38 of a second DC signal generating unit 35 is connected to the second DC input 52 of the first heating frequency generating unit 52.

The DC output 33 of a third DC signal generating unit 30 is connected to the first DC input 56 of a second heating frequency generating unit 55 and the DC output 38 of the second DC signal generating unit 35 is connected to the second DC input 57 of the second heating frequency generating unit 55.

Each heating frequency generating unit 50, 55 comprises two DC inputs 51, 52; 56, 57, each for supplying one signal component from the corresponding DC signal generating unit 25, 30, 35. The heating frequency generating units 50 comprise two DC inputs 51, 52, each for supplying one signal component from the corresponding DC signal generating unit 25, 30. The heating frequency generating units 55 each comprise two DC inputs 56, 57, each for supplying one signal component from the corresponding DC signal generating unit 25, 35.

Each heating frequency generating unit 50, 55 comprises at least one electric switch, in particular at least one relay and/or at least one electronic switch, in particular at least one semiconductor switch, more in particular at least one insulated-gate bipolar transistor, IGBT.

Each heating frequency generating unit 50, 55 comprises at least one half bridge circuit and/or at least one quasiresonant circuit for generating the heating frequency signal.

The power supply circuit 2 is implemented on a single board 95, in particular on a single power board or printed circuit board, PCB.

The power supply circuit 2 on the printed circuit board 95 interacts with a control unit 90 and with at least one user interface 85, in particular by means of a communication bus. This interaction is shown in FIG. 5.

The control unit 90 comprises a frequency control unit 91 for controlling the heating frequency of the heating frequency generating units 50, 55 on the power board 95, in particular independently.

The frequency control unit 91 comprises an interference control unit 92 for controlling the interference between heating frequency generating units 50, 55, in particular between the heating frequency generating units 50, 55 supplied by a single DC bus.

Interference control unit 92 comprises at least one of a noise reduction unit 93 for reducing noise originating from an interference of different heating frequency generating units 50, 55 and/or an immunity unit 94 for reducing parasitic effects originating from an electromagnetic interference of different heating frequency generating units 50, 55, in particular of the heating frequency generating units 50, 55 supplied by a single DC bus.

The noise reduction unit 93 comprises a means for shifting the frequency difference between the frequencies of the heating frequency signals of a first and a second heating frequency generating unit 50, 55 to a frequency difference outside the audible range, in particular by switching at least one frequency to either a first frequency, wherein the frequency difference is below the audible range, or to a second frequency, wherein the frequency difference is above the audible range.

The cumulated maximum power of the at least three or three DC signal generating units 25, 30, 35 is larger than the maximum power of the frequency adapting unit 20.

The external supply signal 10 is a one-phase AC voltage signal, in particular with a voltage of 220V to 250V.

The cooking hob is, in an embodiment, an induction hob 3 as shown in FIG. 3 and comprises four or at least four heating units 70, 75; 81, wherein each heating unit preferably comprises at least one inductor, more preferably at least one coil 81.

The coils 81 can be shaped in circular form, wherein in particular four coils in circular shape can be arranged as a square. The coils 81 in FIG. 3 are shaped in circular form, wherein four coils are arranged as a square.

The cooking hob 3 comprises two power supply circuits 1, 2, wherein each power supply circuit 1 is arranged on a separated power board 95. Each power supply circuit 1, 2 is supplied by a different voltage phase of a 2-phase power supply. In case two power supply circuits 1, 2 are used, each power supply circuit 1 is supplied by a different voltage phase of a 2-phase power supply.

The cooking hob is, in an further embodiment, an induction hob 4 as shown in FIG. 4 and comprises twelve or at least twelve heating units 70, 75; 82, wherein each heating unit preferably comprises at least one inductor, more preferably at least one coil 82.

The coils 82 can be shaped in triangular form, wherein in particular two coils in triangular shape can be arranged as a square. The coils 82 in FIG. 4 are shaped in triangular form, wherein two and also four coils in triangular shape are arranged as a square.

The cooking hob 4 comprises two or three power supply circuits 2, wherein each power supply circuit 2 is arranged on a separated power board 95. Each power supply circuit 2 is supplied by a different voltage phase of a three-phase power supply. In case three power supply circuits 1, 2 are used, each power supply circuit 1, 2 can supplied by a different voltage phase of a 3-phase power supply.

FIG. 5 shows a hob or cooking hob 3, 4 with a user interface 85. The user interface 85 is interacting with a control unit 90. The control unit 90 is interacting with a one or at least one printed circuit board 95 with a power supply circuit 1, 2 according to the invention. Each power supply circuit 1, 2 supplies at least one or at least two groups of heating units 70, 75 with electrical power.

The control unit 90 comprises a frequency control unit 91 as described above.

LIST OF REFERENCE NUMERALS

1, 2 Power supply circuit
11, 12 External supply signal
15, 16 Internal AC supply signal
17, 18 Internal AC supply signal
20 Frequency adapting unit
21, 22 AC Input
23, 24 AC Output
25, 30, 35 DC signal generating unit
26, 27, 31 AC input
28, 33, 34 DC output
32, 36, 37 AC input
38, 39 DC output
40, 41, 42, 43 Internal DC supply signal
44; 45, 46 Internal DC supply signal
50, 55 Heating frequency generating units
51, 52, 56, 57 DC input
53, 54, 58, 59 Heating frequency output
61, 62; 63, 64 Heating frequency signal
70, 75 Heating unit
71, 72, 76, 77 Heating frequency input
80 Induction hob
81, 82 Coils
85 User interface
91 Frequency control unit
92 Interference control unit
93 Noise reduction unit
94 Immunity unit
95 Printed circuit board

The invention claimed is:

1. Power supply circuit for an induction hob, comprising:
a single frequency adapting unit for adapting an external supply signal into an internal AC supply signal,
up to three DC signal generating units, each for converting said internal AC supply signal into one or two signal components of an internal DC supply signal, and
up to four heating frequency generating units, each adapted to convert at least one DC supply signal supplied by at least one said DC signal generating unit into a heating frequency signal for supplying at least one heating unit with electrical power,
wherein the DC output of a first said DC signal generating unit is connected to a first DC input of a first said heating frequency generating unit and a DC output of a second said DC signal generating unit is connected to a second DC input of the first said heating frequency generating unit; and/or
wherein a DC output of a third said DC signal generating unit is connected to a first DC input of a second said heating frequency generating unit and the DC output of the second said DC signal generating unit is connected to a second DC input of the second said heating frequency generating unit.

2. Power supply circuit according to claim 1, wherein each said internal DC supply signal is supplied by a first and a second signal component; and/or wherein the first signal component of each DC signal generating unit supplies a DC voltage and the second signal component supplies a ground voltage, wherein each DC signal generating unit is connected to the same common ground voltage, GND.

3. Power supply circuit according to claim 1, wherein said internal AC supply signal supplies at least of said DC signal generating units with electrical power.

4. Power supply circuit according to claim 1,
wherein each DC supply signal constitutes a DC bus, wherein the power supply circuit comprises at least two DC buses; and/or
wherein each DC supply signal supplies at least one of said heating frequency generating units with electrical power; and/or; wherein a first DC supply signal supplies at least one of said heating frequency generating units with electrical power and a second DC supply signal supplies at least one of said heating frequency generating units with electrical power; and/or
wherein the power supply circuit comprises a number of N DC buses, wherein N=2 or N=3, wherein each DC bus supplies a group of said heating frequency generating units with electrical power.

5. Power supply circuit according to claim 1, wherein said frequency signal comprises a frequency of at least 10 kHZ and/or a frequency of less than 100 KHZ; and/or wherein by varying the frequency of the heating frequency signal generated heating power of the heating unit can be varied.

6. Power supply circuit according to claim 1, wherein the frequency adapting unit comprises a low-pass filter circuit, an RC filter circuit and/or an LC filter circuit.

7. Power supply circuit according to claim 1,
wherein the DC signal generating units are bridge and/or diode rectifiers and/or AC/DC converter; and/or
wherein the DC signal generating units are half bridge diode rectifiers with only two diodes and/or with only one output; and/or
wherein each DC signal generating unit comprises only a single DC output, each for supplying one signal component to at least one said heating frequency generating unit.

8. Power supply circuit according to claim 1,
wherein each said heating frequency generating unit comprises two DC inputs, each for supplying one signal component from said DC signal generating unit; and/or
wherein each said heating frequency generating unit comprises a relay and/or an electronic switch comprising an insulated-gate bipolar transistor (IGBT); and/or
wherein each said heating frequency generating unit comprises a half bridge circuit and/or a quasiresonant circuit for generating the heating frequency signal.

9. Power supply circuit according to claim 1, wherein the power supply circuit is implemented on a single power board or printed circuit board (PCB).

10. Power supply circuit according to claim 9,
wherein the printed circuit board interacts with a control unit and/or with a user interface by means of a communication bus; and/or wherein the control unit comprises a frequency control unit for controlling heating frequencies of the heating frequency generating units in particular independently; and/or
wherein the frequency control unit comprises an interference control unit for controlling an interference between the heating frequency generating units supplied by a single DC bus; and/or
wherein the interference control unit comprises at least one of a noise reduction unit for reducing noise originating from an interference of different ones of said heating frequency generating units and/or an immunity unit for reducing parasitic effects originating from an electromagnetic interference of different ones of said heating frequency generating units supplied by a single DC bus; and/or
wherein the noise reduction unit comprises a means for shifting frequency difference between the frequencies of the heating frequency signals of first and second ones of said heating frequency generating units to a frequency difference outside an audible range by switching at least one said frequency to either a first frequency, wherein the frequency difference is below the audible range, or to a second frequency, wherein the frequency difference is above the audible range, wherein the first and the second heating frequency generating units establish a group of heating frequency generating units connected to the same DC bus.

11. Power supply circuit according to claim 1,
wherein a cumulative maximum power of the DC signal generating units is greater than a maximum power of the frequency adapting unit; and/or
wherein the external supply signal is a one-phase AC voltage signal.

12. An induction hob with up to three power supply circuits according to claim 1.

13. The induction hob according to claim 12, further comprising a control unit and/or a user interface; and/or at least four heating units, wherein each heating unit comprises at least one coil shaped in triangular or circular form, wherein at least two said coils are triangular shape are arranged as a square.

14. The induction hob according to claim 12, further comprising two or three power supply circuits, wherein each said power supply circuit is arranged on a separated power board and/or each power supply circuit is supplied by a different voltage phase of a 2-phase or three-phase power supply.

15. An induction device comprising:
at least one power supply circuit, each power supply circuit comprising:
a filter configured to frequency filter an external AC supply signal and to output a filtered internal AC supply signal;
at least two DC signal generators connected to a common ground, each DC signal generator comprising a rectifier and being configured to convert the internal AC supply signal to an internal DC supply signal; and
at least two heating frequency generators, each heat frequency generator comprising a switch, or a half bridge or quasiresonant circuit, and being configured to convert at least one of the internal DC supply signals into a heating frequency signal, each heating frequency signal having a frequency of at least 25 kHz,
wherein the filter, the at least two DC signal generators, and the at least two heating frequency generators of a same power supply are on a single circuit board, and
wherein a cumulative maximum power of the at least two DC signal generators is greater than a maximum power of the filter;
at least two induction coils, each induction coil being powered by one of the heating frequency signals; and
a controller configured to control the at least one power supply circuit such that a difference between the frequencies of the heating frequency signals is outside of an audible range, and such that parasitic effects between the at least two heat frequency generators are reduced.

16. The induction device of claim 15, comprising:
at least two power supplies,
wherein the single circuit board of each power supply is different, and
wherein the external AC supply signal of each power supply is from a different phase of a mains AC signal.

17. The induction device of claim 15, wherein at least one of the power supplies comprises more DC signal generators than heating frequency generators, and at least one of the internal DC supply signals comprises only a single signal component.

18. Power supply circuit for an induction hob, comprising:
a single frequency adapting unit for adapting an external supply signal into an internal AC supply signal,
up to three DC signal generating units, each for converting said internal AC supply signal into one or two signal components of an internal DC supply signal, and
up to four heating frequency generating units, each adapted to convert at least one DC supply signal supplied by at least one said DC signal generating unit into a heating frequency signal for supplying at least one heating unit with electrical power,
wherein a cumulative maximum power of the DC signal generating units is greater than a maximum power of the frequency adapting unit.

* * * * *